UNITED STATES PATENT OFFICE.

GEORG WANNSCHAFF AND JOSEF SAVELSBERG, OF PAPENBURG, GERMANY.

PROCESS OF SEPARATING ZINC OR ZINC OXID.

999,420.  Specification of Letters Patent.  Patented Aug. 1, 1911.

No Drawing.  Application filed March 23, 1911.  Serial No. 616,443.

*To all whom it may concern:*

Be it known that we, GEORG WANNSCHAFF, of 44 Hauptkanal Links, Papenburg-on-the-Ems, Germany, and JOSEF SAVELSBERG, of 11 Bethlehemkanal Rechts, Papenburg-on-the-Ems, Germany, subjects of the King of Prussia, have invented certain new and useful Improvements in Processes for Separating Zinc from Materials Which Contain Metallic Zinc or Zinc Oxid; and we do hereby declare the following to be a full, clear, and exact description of the invention.

This invention relates to a process for the treatment of materials which contain metallic zinc or zinc oxid, such as galvanized metallic waste or other wastes containing zinc, ores or metallurgical products for the purpose of separating the zinc therefrom.

It is well known that metallic zinc or zinc oxid can be dissolved in a solution of zinc chlorid and such a solution of zinc chlorid has been used already for this purpose. Thus Hopfner as described in the specification of German Patent No. 85812 has already proposed to remove zinc oxid for example from roasted calamin and roasted zinc blende by leaching with a zinc chlorid solution and has stated that hydrated oxid of zinc can be separated by cooling or dilution from the solution of zinc oxid so obtained. This statement does not appear to be substantiated by fact. At any rate the experiments which led to the present invention showed in every case that by cooling down the zinc chlorid solution containing the dissolved zinc oxid there was obtained a precipitate consisting of zinc oxychlorid or a mixture of zinc oxid and zinc chlorid. These experiments also showed that by treating this precipitate with water, particularly at high temperatures, the greater part of the zinc chlorid can be withdrawn and that by effecting the leaching out in a systematic manner so concentrated a solution of zinc chlorid can without difficulty be finally obtained from this precipitate that the zinc chlorid solution can be used repeatedly and directly for the separation by leaching zinc or zinc oxid from materials containing the same.

According to the present invention it suffices to treat the materials in question with an aqueous zinc chlorid solution, in a warm state if necessary, whereby any zinc oxid present is dissolved directly and any metallic zinc present is dissolved with evolution of hydrogen which gas can be collected and is, on account of its purity, capable of being used to advantage. The solution obtained is cooled down and yields a crystalline powder precipitate containing zinc oxid and zinc chlorid. The residual solution is zinc chlorid and can be used for leaching a further quantity of material to be treated. After decantation or other separation of the zinc chlorid solution from the crystalline powder the latter is treated with preferably hot water, in a systematic manner whereby a further quantity of zinc chlorid solution is obtained which can likewise be used for leaching purposes according to the present invention. In such manner the greater part of the zinc chlorid is recovered repeatedly in the form of a zinc chlorid solution capable of being used. The product which remains after this water treatment always contains some zinc chlorid along with the zinc oxid and comprises an oxychlorid having zinc oxid in the proportion of nine equivalents to one equivalent of zinc chlorid and three molecules of water. This product can be decomposed by alkalis or the like such for instance as quick lime or sodium hydrate employed for example in the form of milk of lime, or soda lye into pure zinc oxid, the chlorin in this compound going into solution as a chlorid, such as sodium chlorid, calcium chlorid.

The process possesses the great advantage of cheapness inasmuch as but little of the zinc chlorid needs to be replaced and usually the work can be carried on with the same zinc chlorid solution and the zinc obtained in the form of a good zinc oxid capable of use.

When treating galvanized iron waste for example the process is carried out as follows: The waste is treated in suitable vessels, iron for example, with aqueous solution of zinc chlorid heated to boiling, until it no longer takes up zinc or until no more hydrogen is evolved. The zinc chlorid solution containing the zinc oxid is then run off and allowed to cool. As it cools zinc oxychlorid separates out in a crytalline form. The clear supernatant solution is used to dissolve fresh quantities of zinc. Residual zinc chlorid is dissolved out of the crystalline residue with water whereby an oxychlorid of the formula $$9ZnO, ZnCl_2, 3H_2O$$

remains. More complete extraction of zinc chlorid can be obtained by prolonged boiling with water. It has even been found possible to so completely dissolve out the zinc chlorid that the ratio between it and the oxid is as 1 to 19. The extracted zinc chlorid is converted into zinc oxid and calcium chlorid by treatment with lime so that after washing out the calcium chlorid pure zinc oxid remains behind. The chlorin separated out as calcium chlorid in this reaction, the quantity of which is comparatively small, is replaced by additions for instance of fresh zinc chlorid solution or hydrochloric or sulfuric acid.

We claim:

1. The method of separating zinc or zinc oxid from material containing the same, which comprises leaching the material with a heated aqueous solution of zinc chlorid, cooling the solution to obtain a precipitate containing zinc oxid and zinc chlorid leaching the precipitate with water to remove the greater part of the zinc chlorid, and treating the residue with an alkali to convert all of the zinc salts therein into zinc oxid.

2. The method of separating zinc or zinc oxid from material containing the same, which comprises leaching the material with a heated aqueous solution of zinc chlorid, cooling the solution to obtain a precipitate containing zinc oxid and zinc chlorid, leaching the precipitate with water to remove the greater part of the zinc chlorid, and treating the residue with lime to convert all of the zinc salts therein into zinc oxid.

3. The method of separating zinc or zinc oxid from material containing the same which comprises leaching the material with a boiling aqueous solution of zinc chlorid, cooling the solution to form a precipitate, separating precipitate and solution, leaching the precipitate with water, utilizing both of the resulting solutions for the treatment of new quantities of material and treating the solid residue with lime to obtain the zinc in the form of oxid.

In testimony that we claim the foregoing as our invention we have signed our names in presence of two subscribing witnesses.

GEORG WANNSCHAFF.
JOSEF SAVELSBERG.

Witnesses:
FERDINAND REICHY,
FREDERICK HOYERMANN.